(12) United States Patent
Erickson (10) Patent No.: US 11,350,575 B2
(45) Date of Patent: Jun. 7, 2022

(54) ADJUSTABLE SYSTEM AND APPARATUS FOR PROMOTING PLANT GROWTH AND PRODUCTION WITH SUSPENDED EMITTERS

(71) Applicant: The Agricultural Gas Company, Petaluma, CA (US)

(72) Inventor: Stewart E. Erickson, Petaluma, CA (US)

(73) Assignee: The Agricultural Gas Company, Ventura, CA (US)

( * ) Notice: Subject to any disclaimer, the term of this patent is extended or adjusted under 35 U.S.C. 154(b) by 0 days.

(21) Appl. No.: 16/791,376

(22) Filed: Feb. 14, 2020

(65) Prior Publication Data

US 2020/0281128 A1    Sep. 10, 2020

Related U.S. Application Data

(63) Continuation-in-part of application No. 15/934,693, filed on Mar. 23, 2018, now Pat. No. 11,071,257.

(60) Provisional application No. 62/475,258, filed on Mar. 23, 2017.

(51) Int. Cl.
  *A01G 7/02*    (2006.01)
  *A01G 9/24*    (2006.01)
(52) U.S. Cl.
  CPC .............. *A01G 7/02* (2013.01); *A01G 9/246* (2013.01)
(58) Field of Classification Search
  CPC ... A01G 9/18; A01G 7/02; A01G 9/24; A01G 9/243; A01G 9/246; A01G 9/00; A01G 7/06; A01G 7/00; A01G 22/00; G05B 15/02; A01M 7/0014; A01M 13/00;
  (Continued)

(56) References Cited

U.S. PATENT DOCUMENTS 4,091,566 A * 5/1978 Horvath .................. A01G 7/045
                                                      47/17
6,108,967 A * 8/2000 Erickson ................ A01B 79/02
                                                      47/1.01 R
(Continued)

FOREIGN PATENT DOCUMENTS

CN   102811606 A * 12/2012 ............. A01G 7/045
GB       241164 A * 12/1925 ............... A01G 7/02

*Primary Examiner* — Kathleen I Alker
(74) *Attorney, Agent, or Firm* — Skinner and Associates; Joel Skinner (57) ABSTRACT

A system and adjustable apparatus for applying $CO_2$ gas to improve *Cannabis* production. The system includes upstream and downstream stages or subsystems. The upstream subsystem receives and stores gas, particularly CO2 gas. It monitors the environment of the downstream subsystem, determines when and how to apply gas to plants growing in the downstream system, acquires gas stored in the upstream subsystem, and distributes it to the downstream system. It also has various monitoring, command and control, management, and reporting features. The downstream subsystem includes one or more plant growth areas or plots, gas distribution means, such as gas conduits, tubes or lines from the midstream subsystem, and the high efficiency, adjustable gas applicator, and various sensing and monitoring devices communicatively connected to the upstream subsystem. Also disclosed are odor mitigation and humidity control features.

1 Claim, 9 Drawing Sheets

(58) Field of Classification Search
CPC .............. A01M 13/003; A01M 13/006; A01M 1/2022; A01M 1/2027; A01M 1/2033
See application file for complete search history.

(56) References Cited

U.S. PATENT DOCUMENTS

| | | | | |
|---|---|---|---|---|
| 6,312,139 | B1 * | 11/2001 | Baker | A01G 9/249 |
| | | | | 362/145 |
| 7,475,512 | B2 * | 1/2009 | Van Den Dool | A01G 9/249 |
| | | | | 47/17 |
| 9,894,844 | B2 * | 2/2018 | Takashima | A01G 7/02 |
| 2006/0162247 | A1 * | 7/2006 | Corbett | A01G 9/16 |
| | | | | 47/29.1 |
| 2009/0007779 | A1 * | 1/2009 | Coignet | A01G 9/18 |
| | | | | 95/51 |
| 2016/0157439 | A1 * | 6/2016 | Greene | A01G 9/14 |
| | | | | 47/17 |
| 2018/0125016 | A1 * | 5/2018 | Dufresne | A01G 9/246 |
| 2019/0059242 | A1 * | 2/2019 | Bogner | A61L 9/20 |

\* cited by examiner

ADJUSTABLE SYSTEM AND APPARATUS FOR PROMOTING PLANT GROWTH AND PRODUCTION WITH SUSPENDED EMITTERS

CROSS-REFERENCE TO RELATED APPLICATIONS, IF ANY

This a Continuing In Part (CIP) application of U.S. patent application Ser. No. 15/934,693, filed Mar. 23, 2018, which claims the benefit under 35 U.S.C. § 119(e) of U.S. Provisional Patent Application Ser. No. 62/475,259, filed Mar. 23, 2017, which are hereby incorporated by reference.

37 C.F.R. § 1.71(e) Authorization

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to agricultural systems, apparatus and methods. Particularly, the invention relates to a system of delivering gases to crops. More particularly, the invention relates to an integrated $CO_2$ gas delivery system, subsystems, and apparatus therefor. Most particularly, the systems, subsystems and apparatus are useable to promote plant growth and production in *Cannabis*.

2. Background Information

Hoop house are generally about 60' long, with some being much longer or greenhouses being much longer providing the overall bed length for planting of crops such as *cannabis*. Long beds of *cannabis* and other crops of this configuration are also planted outdoors.

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides an agricultural system, apparatus, and method which are beneficial, practical, reliable, and efficient, and which are believed to fulfill the need and to constitute an improvement over the background technology.

In one aspect, the invention provides system of promoting plant growth and production, comprising a CO2 gas supply; a gas controller communicatively connected to the gas supply; a frame disposed above a plant support surface, and at least one CO2 gas emitter communicatively connected to the gas controller and suspended from the frame whereby the emitter is disposed above at least one growing plant, the gas emitter being height adjustable whereby as the plant grows, the gas emitter may remain in close proximity to the plant.

In another aspect, the invention provides a system of promoting plant growth and production, comprising:
  a. a CO2 gas supply, the gas supply includes a liquid CO2 tank, a pressure builder connected to the tank, and a vaporizer connected to the pressure builder to convert liquid CO2 to CO2 gas;
  b. a gas controller communicatively connected to the gas supply, the gas controller includes a gas input valve communicatively connected to the vaporizer, a gas manifold communicatively connected to the input valve, and an output valve communicatively connected to the gas manifold;
  c. a frame disposed above a plant support surface;
  d. at least one CO2 gas emitter communicatively connected to the gas subcontroller and suspended from the frame whereby the emitter is adapted to being disposed near at least one growing plant, the gas emitter being height adjustable whereby as the plant grows, the gas emitter may remain in close proximity to the plant, the gas emitter including: (i) a gas manifold connected to the output valve, and (ii) an elongated gas emission conduit connected to the gas manifold and having a plurality of gas emission orifices, the emission conduit being height adjustable proximate a plant or plants.

The aspects, features, advantages, benefits and objects of the invention will become clear to those skilled in the art by reference to the following description, claims and drawings.

DETAILED DESCRIPTION

1. Overview

The present invention provides a system, apparatus, and methods for enhancing the growth of plants, particularly *Cannabis*, and most particularly *Cannabis* grown in green houses, hoop houses and the like. The invention utilizes Carbon Dioxide gas ($CO_2$ or $CO_2$). The invention administers the gas in close proximity to plants growing in groups or plots so that the plants receive a maximum beneficial amount of the gas, for the longest reasonably possible time period. This also reduces cost to the grower. The system is able to maintain that close proximity distribution by various means including a height adjustment means that permit the grower to easily adjust gas application height throughout the plant growth life cycle from seedlings or clones, juveniles, to mature plants ready for harvest. Significantly, a gas administration assembly provided by the invention is disposed over the plants, in particular, suspended thereover. Further, the system permits fast and easy upward retraction at harvest time so that the gas distribution and application devices do not interfere with harvest tasks, whether manually or mechanized. The system is optimized to provide full monitoring and control of gas application, coordinated with light exposure, temperature regulation, watering, fertilizing and the like. The system may be integrated with lighting, heating, watering and feeding systems. Alternatively, it may be readily retrofitted to existing systems and devices.

Referring to FIGS. 1-5, an embodiment of a system 10 of the invention is preferably a multi-stage system which basically comprises upstream and downstream stages or subsystems. The upstream subsystem 12 shown in FIG. 5 receives and stores gas, particularly CO2 gas. It also monitors the environment of the downstream subsystem, determines when and how to apply gas to plants growing in the downstream system, acquires gas stored in the upstream subsystem, and distributes it to the downstream system. It also has various monitoring, command and control, management, and reporting features. The downstream subsystem shown in FIGS. 1-4 comprises one or more plant growth areas or plots, gas distribution means, such as gas conduits, tubes or lines from the midstream subsystem, and the high efficiency, adjustable gas application means, and various sensing and monitoring means communicatively connected to the midstream subsystem.

In the system, the plant growth plot or plots are preferably relatively compact, sheltered environments such as hoop houses or greenhouses. Most particularly, the green houses are hoop-type houses that are easy to construct from basic materials such as dimensional lumber, PVC plastic conduit, lightweight but rigid metal tubing and the like for base structures. They typically have roofs or tops, most often constructed of transparent or semitransparent, thin, flexible plastic material. The plastic sheet or sheets are placed over and supported by hoop supports (typically curved to shed rain, wind, snow and the like) placed at predetermined distances apart, which are supported by the base structure. The sheets are typically stretched tight over the roof hoop supports to aid in shedding the elements, but also to reduce noise from flapping in the wind, and to improve structural integrity. Houses typically have side and end walls. Such walls may be adjusted or removed depending up temperature, climate and other factors. The walls are also typically constructed of flexible materials, most typically transparent or semitransparent materials. Hoop houses commonly are constructed on grade and have rectangular floor plans. Plants may be grown on grade, with existing soil (enhanced or not). The system may also be applied to houses constructed on slabs of concrete, asphalt or other non-soil substrates. Lastly the system may be deployed in existing interior structures such as permanent greenhouses, warehouses, and other structures. Hoop houses may be provided with irrigation systems, light systems, heating systems, power, and the like. Although the invention is described in the context of a hoop houses, it is within the purview of the invention that the systems, apparatus and methods may be applicable to greenhouses, and in certain circumstances, outside in fields, orchards, vineyards and the like.

Figure 1:
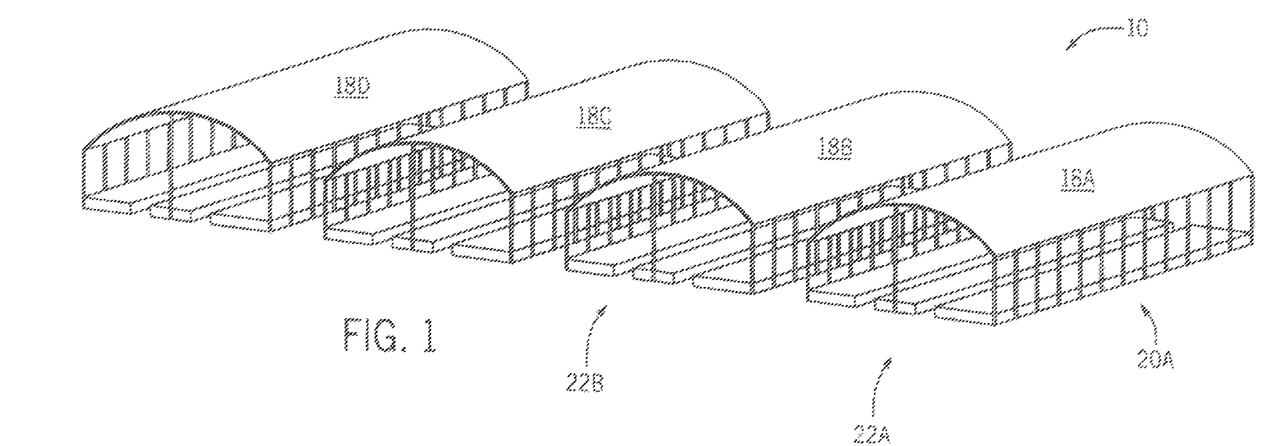
FIG. 1 is a perspective view of an embodiment of the system of the invention, including a hoop farm with one or more hoop houses laid out in one or more rows and/or columns.

Referring to FIG. 1, the downstream subsection of the system 10 of the invention consists of multiple hoop houses 18 constituting a farm, with plural houses arranged in rows 20 A-C and columns 22 A-C, respectively, both shown started by their first members. Paths exist between rows 20 and columns 22 of houses 18 for convenient movement of staff, equipment, material and harvested crops. Referring also it) FIGS. 2-4, the hoop houses 18 have an elongated, rectangular configuration with first or proximal, and second or distal end walls 90 and 94, respectively, and side walls 92 and 96. Walls 90-96 are supported by corner posts 98A-D and a plurality of mid posts 100, the number of which depend upon the length of the house 18. The vertical walls 90-96 have a peripheral top plate 102. Curved, roof hoops 104 extend from one side of the plate 102 to the other. Roof material 106 is supported by the hoops 104. The roof 14 may be supported at its ends by one or more end supports 108.

The exemplary houses 12 for growing *cannabis* have a length of approximately sixty (60) feet, a width of approximately fifteen (15) ft., and a height of approximately five (5) ft, measured at the base wall and approximately nine (9) ft. at the apex of the hoop. In the preferred embodiment, the downstream stage or farm of hoop houses 12 is disposed within a fence or other security structure. Ingress and egress occurs though one or more gates.

The upstream subsystem 12 is communicatively connected to the downstream subsystem via gas, electrical and data line conduits 24 and radio frequency (RF) and Wi-Fi wireless transmission. Gas is supplied to individual plots 18A-C via plot lines 28A-C. Gas may extend to plots disposed in columns behind a first row 20A of plots 18A-D via longitudinal feed lines, and then to further lateral trunks. Although the layout of plots 18 in the downstream subsection have been shown rectilinearly, they may be disposed in various other linear or non-linear arrangements. Gas lines are preferably buried, but they may be disposed above grade.

Figure 5:
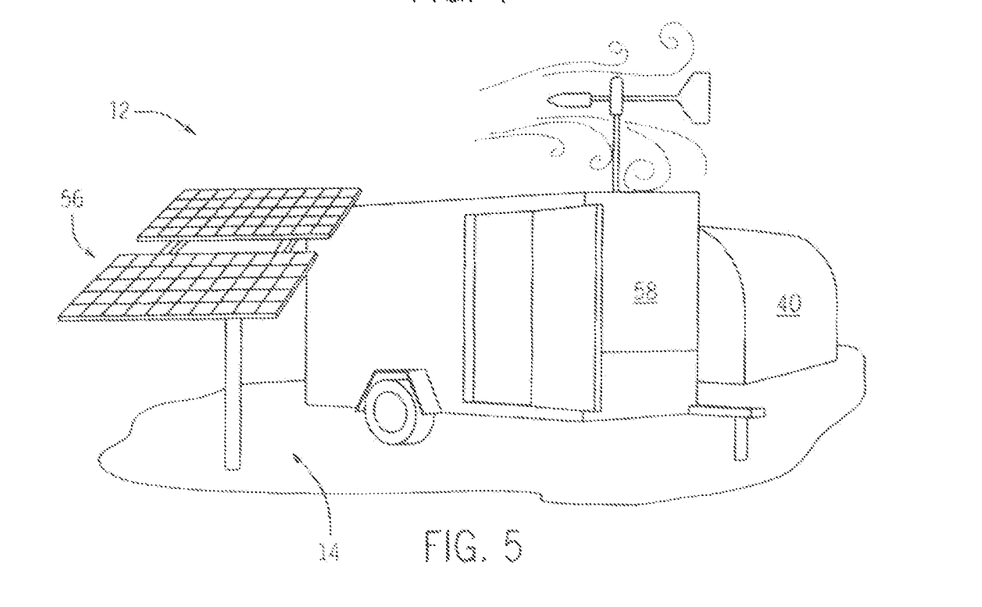
FIG. 5 illustrates an embodiment of the upstream components and features of the system, including a gas storage tank being filled by a gas transportation truck, a trailer containing various gas and electronic control features, and a solar power array.
Figure 6:
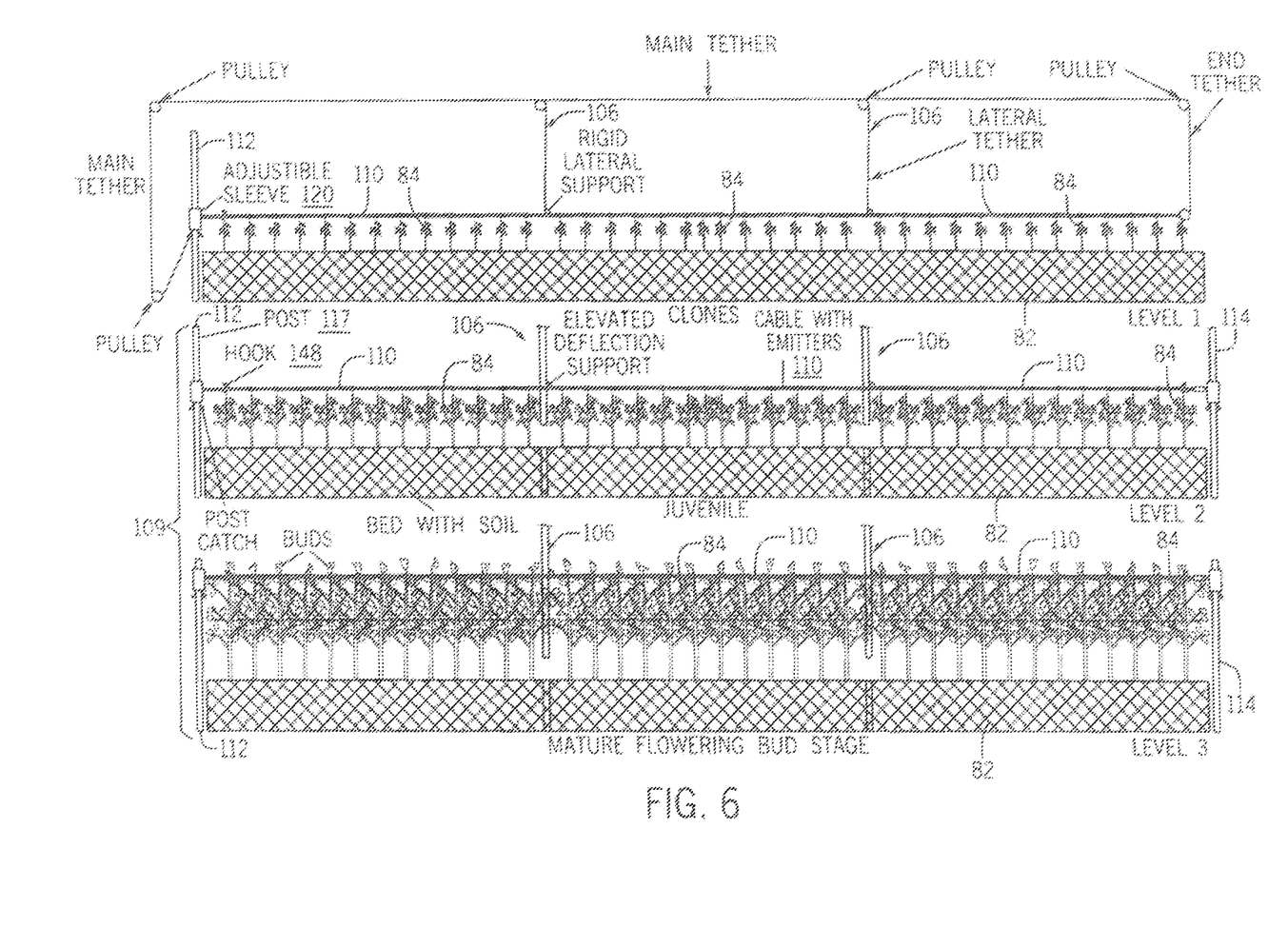
FIG. 6 illustrates the adjustability function and features of the system of the invention during the life cycle of plants processed from clones, juvenile, to mature flowing bud stage for *Cannabis*, wherein the clone stage is shown utilizing a tether and pully arrangement and the juvenile and mature stages are shown utilizing an alternative arrangement where rigid members such as posts are suspended from above.
Figure 7:
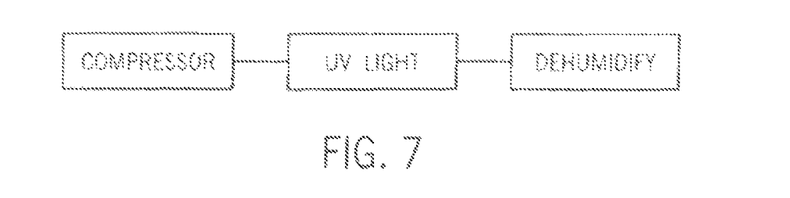
FIG. 7 is a block diagram of an embodiment of an optional Inbound Moisture and Fungal Control Assembly of the system of the invention.
Figure 9:
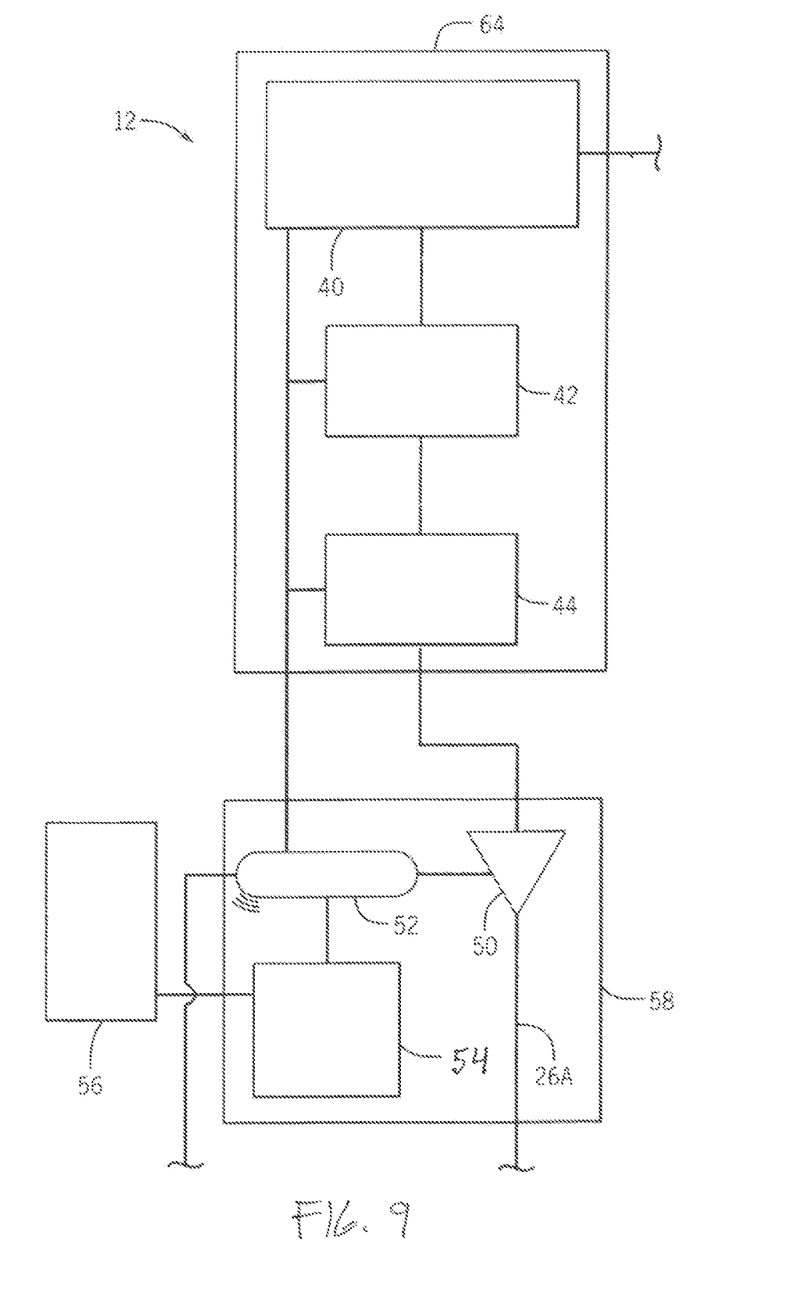
FIG. 9 is a more detailed diagrammatic view of an embodiment of the upstream subsystem.
Figure 10:
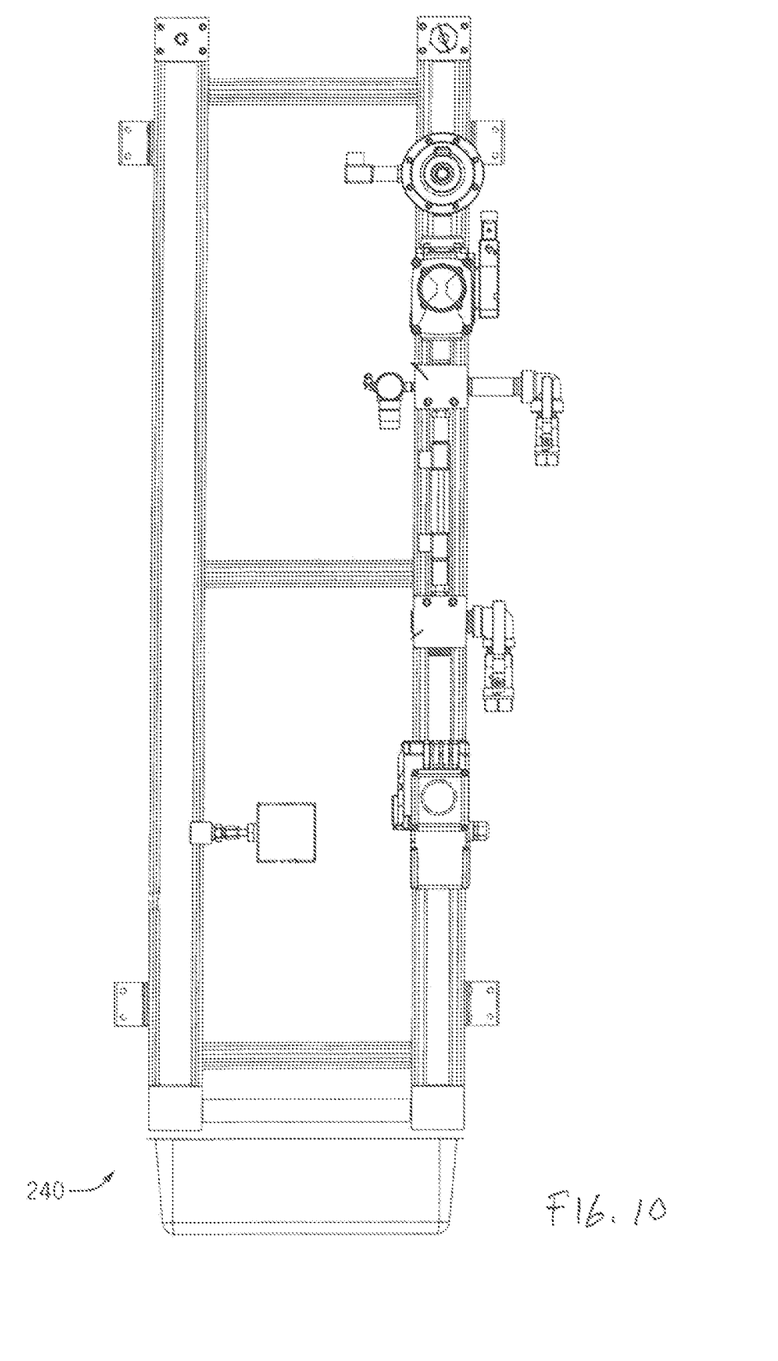
FIG. 10 is a front view of an embodiment of the gas controller.
Figure 11:
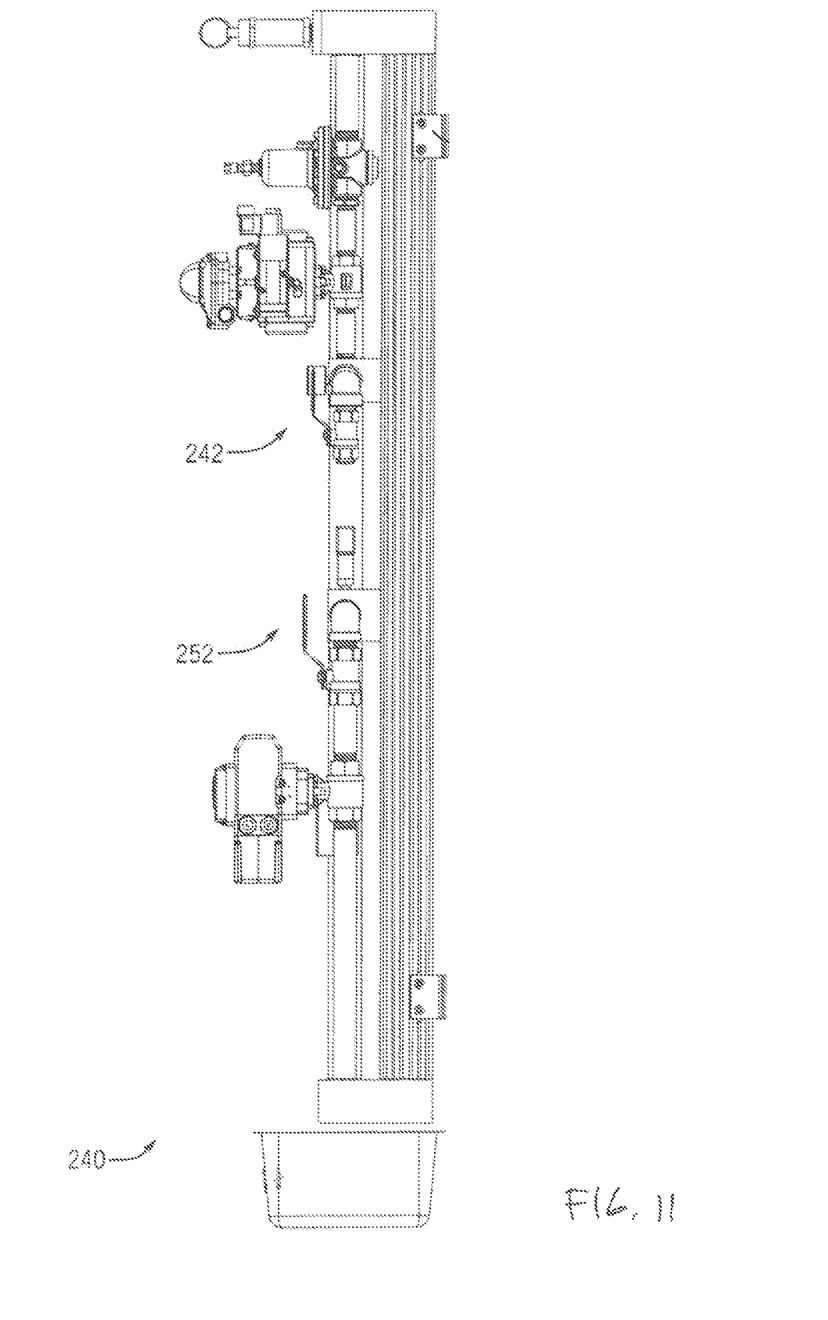
FIG. 11 is a side view of the gas controller.

A preferred embodiment of the upstream subsection 12 is shown in FIGS. 5 and 9. The subsection 12 preferably comprises a tank 40, a gas controller valve assembly 50, an electronic control assembly 52, and a power supply 54. The tank 40 holds liquid Carbon Dioxide (CO2). It has a bulk storage capacity of between 5 and 50 Tons of liquefied CO2. It is within the purview of the invention that CO2 may be supplied in smaller quantiles such as 1,000-pound Dewars. And the system may be deployed in close proximity to a CO2 manufacturing facility (i.e. an ethanol, ammonia or power generating plant) and CO2 be directly derived therefrom. An exemplary tank is manufactured by Chart Industries of Prior Lake, Minn., USA. The tank 40 has a fill inlet 62. The tank 40 is preferably also connected to a pressure builder 42 which maintains the $CO_2$ in a liquid form in the tank 40. An exemplary pressure builder 42 is manufactured by Air Products of Allentown, Pa., USA. A vaporizer 44 is also connected to the tank 40. It functions to convert $CO_2$ from the tank 40 in a liquid state into a $CO_2$ in a gas state for use in the system. $CO_2$ gas exits an outlet at a pressure of between 200 and 400 psi., preferably 300 psi. An example vaporizer 44 is available from Thermax of Dartmouth, Mass., USA. The vaporizer 44 is connected to the gas controller valve assembly 50. Preferred components of the valve assembly 50 are shown in FIGS. 10 and 11, and include a manifold assembly 240, an input valve assembly 242 connected to the manifold assembly 240, and an output valve assembly 252 also connected to the manifold assembly 240. The upstream subassembly 12 is preferably secured by its own security fence.

The upstream subsystem also comprises the valve assembly, electronic control assembly, RF and Wi-Fi transmission and power supply. These components are preferably located in a secure housing. In the preferred embodiment, they are shown disposed in a trailer 58. The valve assembly controls distribution of $CO_2$ gas to the downstream system. The electronic control assembly is communicatively connected to the valve assembly and provides instructions to it, as to how to most efficiently distribute gas. The electronic control assembly is powered by power supply. The power supply preferably contains batteries and AC power connections. The upstream section also preferably has a solar array 56 for recharging the batteries of the power supply. The electronic control assembly preferably has both direct wire connections and wireless (WIFI, RF or the like) connections to various sensors (temperature, humidity, $CO_2$ concentration, light intensity, wind speed, wind direction, and infrared leaf temperature readings that help determine VPD—vapor pressure deficit) disposed in the downstream section. The electronic control assembly also preferably has means to connect remotely via hardwire telephone, CDMA cell and/or satellite transmission.

Returning to FIGS. 2-4, the individual hoop houses 18 of the downstream section include plural, for example three (3) beds 70A-C. The beds 70, preferably have an elongated, rectangular configuration, with proximal and distal end walls 72 and 76 and side walls 74 and 78 surrounding a central planting area 80. The planting area 80 may utilize existing soils, on grade or built up, or preferably contains a particular planting media 82. The beds 70 have a thickness or depth of between 6 and 18 inches, preferably about 10 in. when 2×12 dimensional lumber is used for the walls 72-78. Media 82 substantially ills the planting area 80 to a depth of approximately 9 in. As is best shown in FIGS. 9 and 16, once the beds 70 are planted with seeds, seedlings, clones or other small plants 84, mulch (such as straw) may be applied to the beds 70, covering the planting area 80 between the individual plants 84. A stabilizing mesh trellis blanket 118 may then be applied, covering the planting area 80. Typically, multiple layers (for example four or more) of mesh are applied sequentially as the plants mature. Although the beds have been described as being constructed on the floor of a hoop house or the like, it is within the purview of the invention that the beds could be laid out on elevated tables or other elevated structures containing natural or artificial soils, or hydroponic liquid media, or trays, pots, soil containing bags or the like.

2. Overhead, Suspended Emitters

In the preferred embodiment shown, paths exist between beds for movement of staff, equipment, material and harvested crops. However, the intra bed paths are small and tight so that maximum space inside the house is devoted to plant growth. Because of this, applicants' invention has a means of maintaining clear paths or rendering them clear during maintenance or harvest. The exemplary bed for growing *Cannabis* has a length of approximately 58 feet to 100 feet, a width of 3 ft. to 4 ft., and a bed height of about 1 ft. The smaller dimensions yields a planting area 80 of approximately 180 square feet. The intra-bed paths are approximately 18 in. wide. Ingress and egress occurs though one or both ends of the hoop house.

Figure 2:
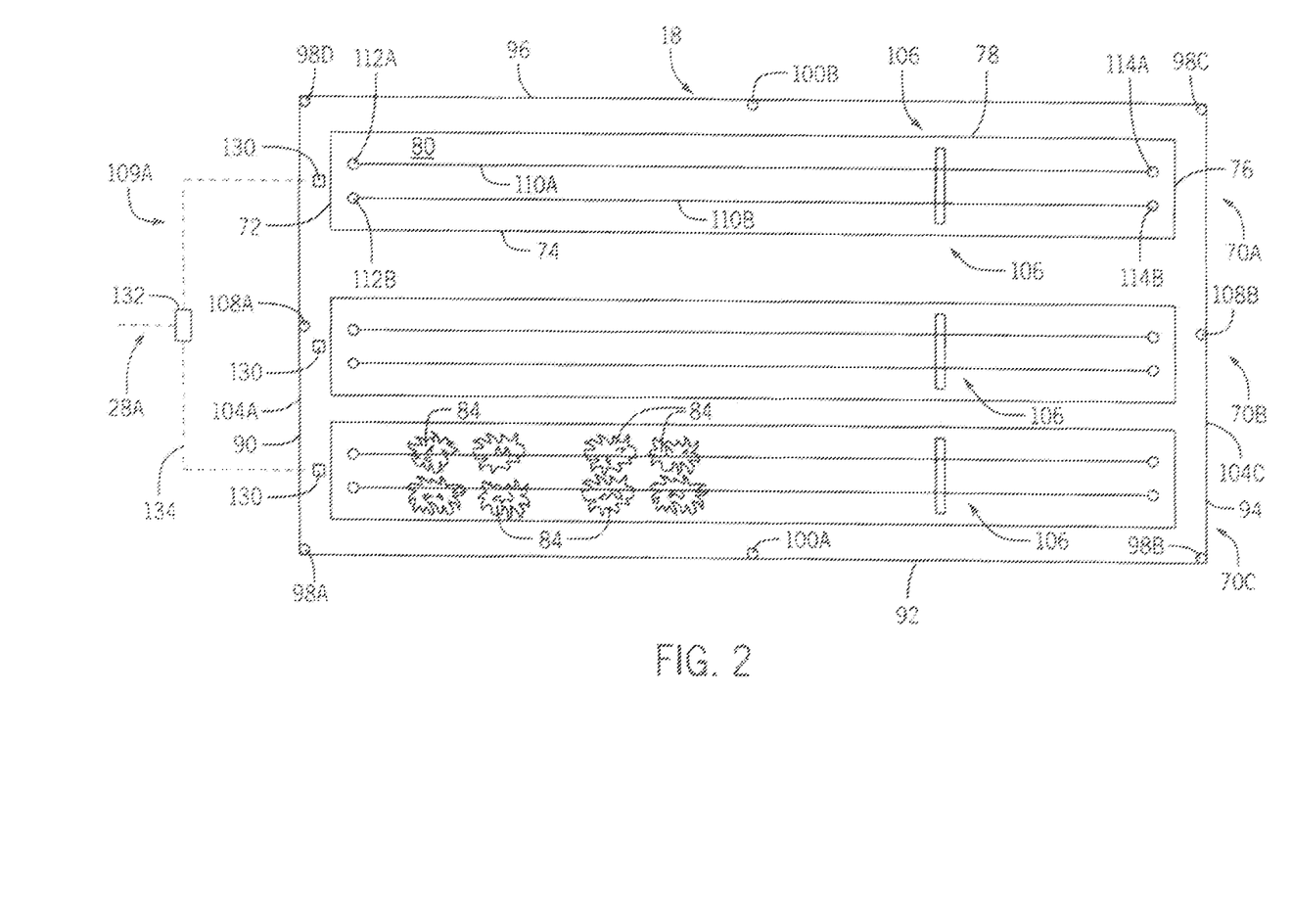
FIG. 2 is a plan view of an embodiment of a gas distribution system deployed in a hoop house.
Figure 3:
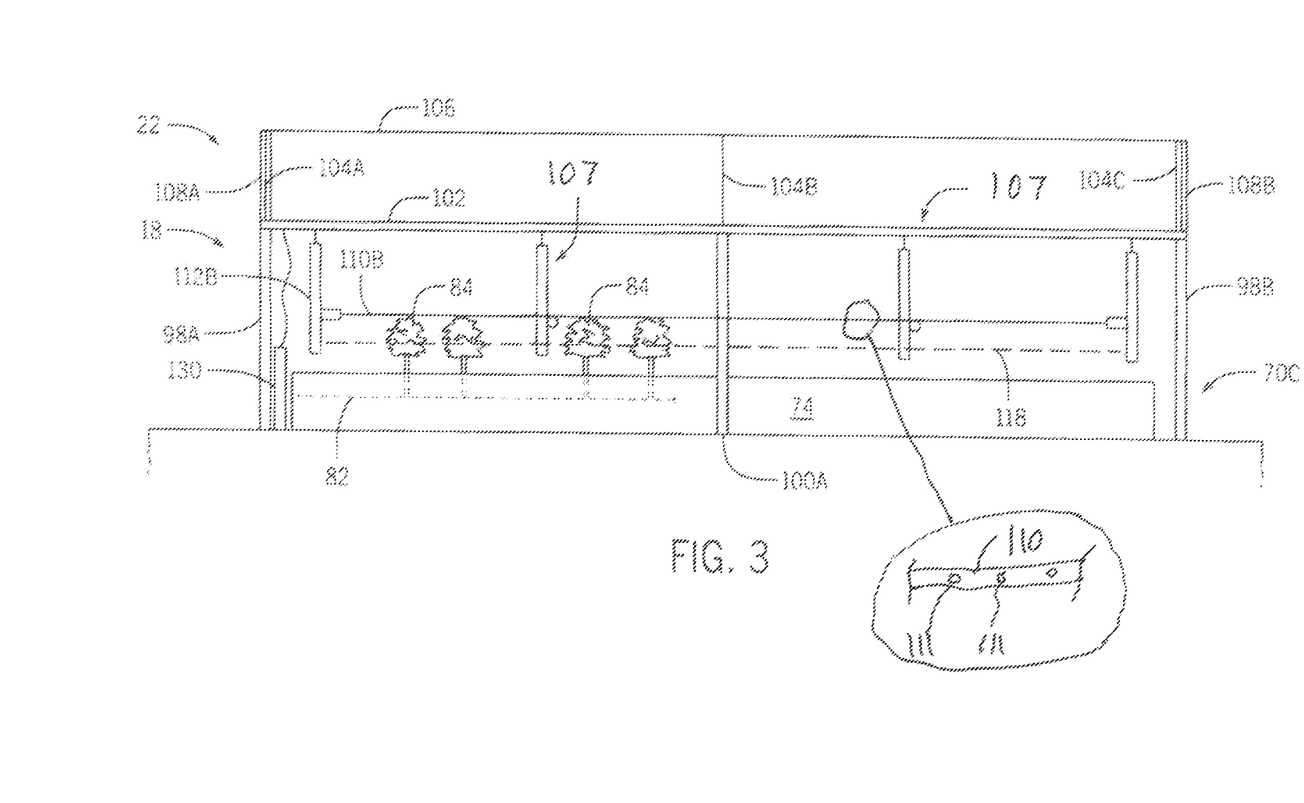
FIG. 3 is a side elevation view of the system components and features of FIG. 2.
Figure 4:
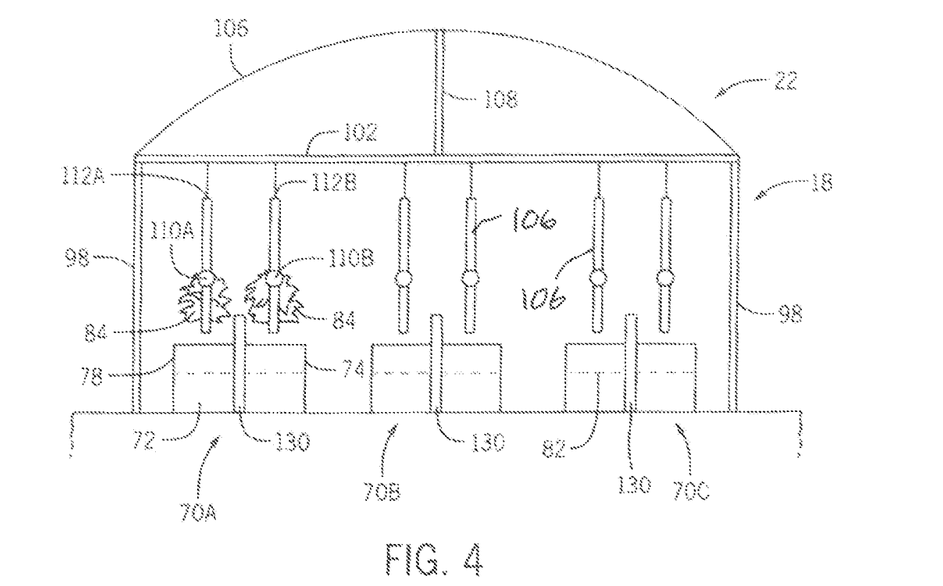
FIG. 4 is an end view of the system components and features of FIGS. 2 and 3.

Each bed 70 includes an overhead, suspended gas emission assembly 109. Referring also to FIGS. 2 and 3, one embodiment of the gas emission assembly 109 includes a bed distribution manifold 130 and at least one gas emission line, tube or conduit 110. In the preferred embodiment, a pair of lines 110A-B is utilized. The gas distribution manifold 130 is disposed at the first or proximal end of the bed 70, nearest the up and midstream subsystems 12 and 14, and receives gas therefrom. For house 18 having plural bed 70, the manifold 130 for each bed may receive gas from a hoop house distribution splitter or manifold 132 (connected to the main gas line 28A) via supply lines 134. Lines 134 are preferably buried under the soil. Emission lines 110 are elongated and extend essentially the entire length of each bed 70. Lines 110 A and B are disposed a predetermined distance apart, preferably 12 in., the lines also being equally spaced from the sides of the bed 70. The lines 110 are tubes, disposed over the plants, having a central gas lumen and a plurality of emission apertures or orifices 111, which emit $CO_2$ gas to the plants 84. The lines 110 are preferably constructed of a flexible plastic material and have an outside diameter of ⅝ in. The apertures 111 are preferably circular and have a diameter of between ¼ to ¾ in. The lines 110 are supported by suspended rigid or semi-rigid members or by flexible tethers 112 and 114. The lines 110 are suspended over the plants by these supports 112/114, which are connected to the framework 102 of the hoop house or a secondary frame means. The lines 110 may be connected to lateral members. Direction connection may be made in the alternative. The lateral members also can function to distribute and circulate gas. The proximal member is shown to be communicatively connected to the manifold 130 via gas line 140. Proximal member is then connected to each line 110A-B via flexible lines and coupler assemblies. In view of the length and flexibility of the emission lines 110, at least one lateral mid-support assembly 107 may be disposed along the length of the lines 110, typically at the mid or half way point of the length of the lines 110 generally at 20' to 30' intervals or such spacing necessary to prevent significant drooping in the lines and to prevent the lines from undesirable flapping in the wind. The lateral support preferably extends below and supports both lines 110A-B for ease of adjustment. A $CO_2$ gas line pressure sensor 156 is preferably connected in line with the assembly 130, preferably at the downstream end. This embodiment of the assembly 130 utilizes a continuous loop lumen from end to end. Alternatively, the gas lines 110 A/B may terminate at the distal end whereby all gas is emitted from the line apertures and does not circulate.

Significantly, the gas emission assemblies 109 are height adjustable so that the lines may be disposed and maintained within intimate proximity to the upper leafy canopy of the plants where sunlight is directly incident to said leaves and 
adjustable to the upper canopy of the plants 84 as they grow. As the plants grow the lines can be slightly nested within the canopy, and preferably not be disposed more than a few inches above the canopy due to loss of efficacy of the CO2 due to wind losses and diffusional forces losses known technically in physics and chemistry as Brownian Motion. The lines 110 will be oriented just at the tops of the plants.

Returning also to FIGS. 2-4, the method of constructing the height adjustable fluid distribution and emission assemblies (and for using such assemblies) for each bed is discussed An emitter line (or simply emitter) is extended the length of the row. The emitter is preferably constructed of PLATIX tubing. Cross members or aerial ties can be used intermittently down the row to support deflection in the emitter run as desired, for example a 3-20 foot spacing to create a scallop effect down the length of the row, but generally supporting the emitters at an equally desirable height at or just above the top of the plants from one end of the bed to the other. Another benefit of the height adjustment assembly is that it can be constructed either on-site or pre-made and delivered to the site.

Emitters are positioned intimately proximate to the upper leafy canopy of the crop where sunlight is predominately incident. As the crop 48 continuously grows, emitters are moved incrementally upwardly as needed to accommodate plant growth and to stay above of the introduction of the latest applied mesh trellis in the bed as is commonly known and used in the cultivation of *cannabis* or other such crops. Upward mobility of the device is permitted to correspond to plant growth. They may be removed or moved out of the way to facilitate harvest and other agronomic functions like the introduction of mesh.

Referring to FIG. 6, lateral supports are tethered from above with a flexible string, line, cord, cable or the like, up to a pulley. The pulley is suspended from the ceiling of the hoop-house or greenhouse structure, or some overhead rigid station or framework. Several tethers are preferably positioned along the length of the elongate gas emission conduit to provide adequate support and each of the tethers runs upwardly to and through the overhead suspended pulley. The multiple tethers, in their entirety, preferably adjoin and run to a single main tether. The main tether preferably runs downwardly through a pulley to raise and lower the gas emission as desired by the grower to allow various agronomic functions like: planting, installation of mesh trellis, harvesting and others routine functions. Further, the entire system is preferably tethered through a lower pulley using the main tether returning to and being affixed to the height adjustment mechanism on the headpost. Thus, as the head post height adjustment is moved, the entire elongated gas conduit raises and lowers precisely with this adjustment.

The elongated gas emitter conduit with orifices is rigid enough to maintain it in an elongated position, sufficient to produce even flow of fluids/gases down its entire length, requiring only lateral support at intervals to maintain its desirable elongated position proximate to the upper leafy canopy of the plants. The lateral support and at least one end support down the length are disposed at approximately 10 to 30 foot intervals, as necessary, to support exaggerated deflection, curvature and kinking along the length of the elongated gas emission conduit.

In an alternative design, posts are eliminated entirely, including end posts, and the height adjustment can be accomplished with small electric motorized winches or manually operated cranks or the likes. It is within the purview of the invention that the system may utilize machine learning whereby sensors can daily adjust the height of the system to correspond with plant growth.

In an alternative embodiment, the adjustable tethering is accomplished by a more rigid material and are adjustable via a suspension hinges. Interestingly enough, most plant species including require $CO_2$ gas during the daytime to support photosynthesis. A few special plant species like pineapples and xerophytes (desert plants) uptake $CO_2$ at night to conserve water. But for plants like *Cannabis* and most "normal plants", their $CO_2$ is required during the day and supplementing $CO_2$ increases their photosynthetic rates.

Many of these high value crop species like *Cannabis* and berry crops are generally grown along the California coasts. At night, fog will often roll in subjecting the crops to undesirable exposure to moisture on the plants which leads to detrimental mold and diseases, one commonly associated with *Cannabis* known at WPM white powdery mildew and BT batrietyuss. The presence of BT on the *Cannabis* crop can spread in very short time frame and can render the crop valueless just as it is ready o be harvested. Neem oil the most common organic preventative measure for mold cannot be used during the critical flowering stage of the plants development.

Also, odor nuisance associated with *Cannabis* cultivation is a major public problems for neighbors and the likes. Some counties like Santa Barbara County in California even call for "Best available practices" with regard to odor control. The odor is by far most notable at night as the cool valley air settles into valley floors and creeps into towns where waking up is commonly associated with a "skunky odor".

The present invitation provides the apparatus and hardware and software to address these multiple issues in a most efficient manner. The sprayer lines can provide $CO_2$ ruing the day. At night the spray lines can provide dried/dehumidified air into the hoop houses and beds of plants to displace the fogging moisture air. A second line can suck, vacuum and extract to moist air and odor filled air from along the up reaches of the beds and system, consolidating air from all hoop houses and beds into a single column of air to be treated for odor control before release to the surrounding atmosphere.

As is described below, inbound air can contain an ultra violet light to kill fungal spores to reduce the spread of BT throughout the grow. A dehumidifier, in-bound compressors to move the air, outbound compressors to extract the air if necessary (can't circulate), and an odor control technologies may be provided to eliminate the stinky terpenes in the consolidated air.

3. Humidity Control

Humidity control in greenhouses and hoop houses is a significant problem, principally at night. Humidity levels routinely elevate to 100% humidity at night, when the ventilation doors and windows are closed. This is due to the plants continued respiration of large amounts of water vapor. This nighttime buildup of humidity and moisture condensation, is directly responsible for mold formation on the flower, which is an economic management problem for both *cannabis* growers and other crops grown in greenhouses. The presence of mold can render the harvest completely valueless.

Therefore, it is envisioned that the current invention can be used at night in immediate proximity to the leaves and flowers, when it is not delivering the daytime $CO_2$ enrichment, to pump in pre-treated, dry air. FIG. 7 is a block diagram of an embodiment of an optional Inbound Moisture and Fungal Control Assembly of the system of the invention. A "cut-in" valve (allowing deactivated $CO_2$ supply to be isolated), air compressor and a dehumidifier are provided, providing for the input of ambient air that is dehumidified. This is a very efficient method as all existing field plumbing can be used to input the dry air; all that is needed a cut in valve.

Preferably, the input air is passed through UV fungal spore killing lights to prevent the spread of undesirable pestilence. Also, the input air can have a thermal component added if desired.

4. Odor Mitigation

Competing systems put out a curtain of chemicals into air surrounding the perimeter of grow sites like greenhouses and such, or are mounted near the roof vents of greenhouses to attempt to mitigate odor. The present invention targets the micro-climate directly at the plant level or "Bed level" for odor mitigation addressing the problem at the source, versus competing macro-climate umbrella systems. The mitigation of odor from very fragrant *cannabis* is also very much a night time build up phenomena. So the off-take of very humid air is also very odorous (stinky) nuisance air, preferably takes place on a hydraulically balanced line that sucks up (reverse arduous path emitter) located generally 1-3 feet distant to the input line with flow balanced to the desirable matching flow rates if necessary for pressure management desired in the structure. The sucking up and management of odor and humidity off-take preferably happens in conjunction with the dry air input.

The two-line $CO_2$ system input described in the present invention, may be used in this described methodology at night to achieve both humidity control and odor mitigation. Preferably, to conserve energy, the two air flows pass across each other through an air-to-air heat exchanger to conserve energy. Lastly, the invention may utilize: (1) infrared leaf temperature sensors to determine VP) as a control either too high or too low can trigger controller accommodation; (2) pressure sensors in the system trigger an alert and automatic shutoff of CO2; and $CO_2$ sensors trigger an alert and automatic shutoff of $CO_2$.

Figure 8:
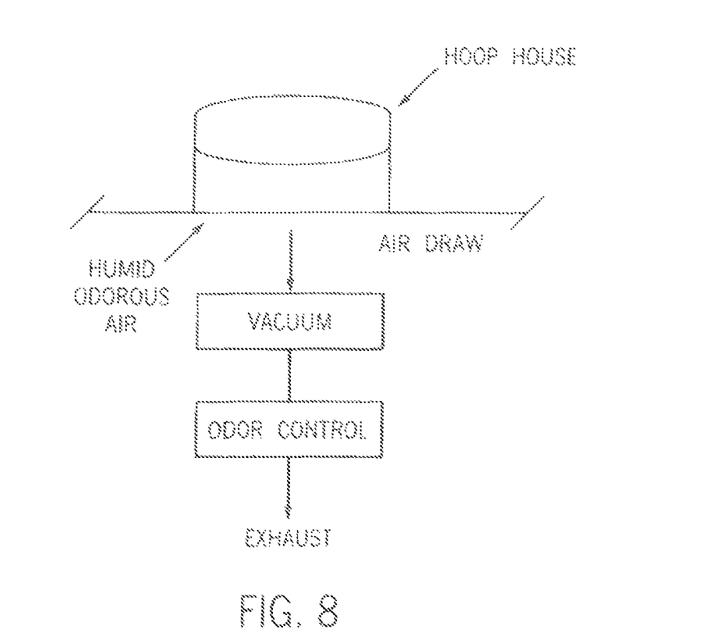
FIG. 8 is an embodiment of an optional Odor Control Assembly of the system of the invention.

FIG. 8 illustrates an embodiment of an optional Odor Control Assembly of the system of the invention. The main components are: the invention as described with hydraulically balanced, uniform off-take, elongated conduit located "immediately proximate" to the entire plant canopy (less than 2 feet away), a compressor or vacuum to drive the mass movement of air to and through desirably a carbon filter to absorb the odor, preferably a 6 inch Air Carbon Filter Odor Control Scrubber with Australia Virgin Charcoal, such as is available f rom iPower of Irwindale, Calif.

Applicants also hereby further incorporate by reference the disclosures of and can be used in conjunction with the following US Patent Documents:

Title: INTEGRATED, SELF SUPPORTING ELEVATED GAS DELIVERY TUBE AND LED LIGHT FOR CROP FOLIAGE Application No. 62/367,276 Filing Date: Jul. 27, 2016

Title: GROUND TO CANOPY GASEOUS MEDIA DELIVERY SYSTEM FOR CROPS INCLUDING LEAK DETECTION AND HOOK AND WAND FEATURES Application No. 62/403,800 Filing Date: Oct. 4, 2016

Title: MULTI-MEDIA IRRIGATION TECHNOLOGY Application No. 62/331,592 Filing Date: May 4, 2016

Title: AERIAL FLUID APPLICATION TECHNOLOGY FOR ORCHARDS, VINEYARDS AND THE LIKE U.S. Pat. No. 10,165,732 Issue Date: Jan. 1, 2019

Title: AERIAL FLUID APPLICATION TECHNOLOGY FOR ORCHARDS, VINEYARDS AND THE LIKE Application Ser. No. 16/196,605 Filing Date: Nov. 20, 2018

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A system of promoting plant growth and production, comprising:
   a. a CO2 gas supply, the gas supply includes a liquid CO2 tank, a pressure builder connected to the tank, and a vaporizer connected to the pressure builder to convert liquid CO2 to CO2 gas;
   b. a gas controller communicatively connected to the gas supply, the gas controller includes a gas input valve communicatively connected to the vaporizer, a gas manifold communicatively connected to the input valve, and an output valve communicatively connected to the gas manifold;
   c. a frame disposed above a plant support surface;
   d. at least one CO2 gas emitter communicatively connected to the gas controller and suspended from the frame whereby the emitter is adapted to be disposed near at least one growing plant, the gas emitter being height adjustable whereby as the plant grows, the gas emitter may remain in close proximity to the plant, the gas emitter including: (i) a gas manifold connected to the output valve, and (ii) an elongated gas emission conduit connected to the gas manifold and having a plurality of gas emission orifices, the emission conduit being height adjustable proximate a plant or plants.

* * * * *